US012233015B2

(12) United States Patent
Zhang

(10) Patent No.: US 12,233,015 B2
(45) Date of Patent: Feb. 25, 2025

(54) PORTABLE MASSAGER

(71) Applicant: Nekteck, Inc., Anaheim, CA (US)

(72) Inventor: Xing-Fu Zhang, Shenzhen (CN)

(73) Assignee: Nekteck, Inc.

( * ) Notice: Subject to any disclaimer, the term of this patent is extended or adjusted under 35 U.S.C. 154(b) by 859 days.

(21) Appl. No.: 17/389,872

(22) Filed: Jul. 30, 2021

(65) Prior Publication Data

US 2022/0304886 A1 Sep. 29, 2022

(30) Foreign Application Priority Data

Mar. 29, 2021 (CN) ......................... 202110330378.8
Mar. 29, 2021 (CN) ......................... 202120625541.9

(51) Int. Cl.
*A61H 15/00* (2006.01)
*A61H 9/00* (2006.01)
*A61H 23/02* (2006.01)

(52) U.S. Cl.
CPC ....... *A61H 15/0078* (2013.01); *A61H 9/0078* (2013.01); *A61H 23/02* (2013.01); *A61H 2015/0014* (2013.01); *A61H 2015/005* (2013.01); *A61H 2201/0157* (2013.01); *A61H 2201/0173* (2013.01); *A61H 2201/0207* (2013.01); *A61H 2201/1642* (2013.01); *A61H 2201/1657* (2013.01); *A61H 2201/169* (2013.01)

(58) Field of Classification Search
CPC ............ A61H 15/00; A61H 2015/0007; A61H 2015/0071; A61H 15/0078; A61H 19/0078; A61H 2015/0014; A61H 2201/0157; A61H 2201/0138; A61H 2201/0149; A61H 2201/0161; A61H 7/004; A61H 1/0266; A61H 2205/12; A61H 33/6005; A61H 23/0263; A61H 33/6089; A61H 35/006; A61N 2005/0659
See application file for complete search history.

(56) References Cited

U.S. PATENT DOCUMENTS 6,149,611 A * 11/2000 Chen .................. A61H 23/0263 601/50
2002/0013964 A1 * 2/2002 Kuen .................. A61H 35/006 4/622
2003/0050578 A1 * 3/2003 Suh ...................... A61H 9/0078 601/102

(Continued)

*Primary Examiner* — Margaret M Luarca
*Assistant Examiner* — Sarah B Lederer
(74) *Attorney, Agent, or Firm* — ScienBiziP, P.C.

(57) ABSTRACT

A portable massager includes a housing, a first connecting shaft, a second connecting shaft, a supporting rod, a supporting arm, and a massage device. The housing includes an upper cover and a base. The upper cover and the base cooperatively define a receiving space. Two spaced apart massage grooves are recessed from the upper cover toward the base and are each in air communication with the receiving space. The first connecting shaft and the second connecting shaft are disposed on a bottom surface of the base. An end of the supporting rod is rotatably connected to the base through the first connecting shaft. An end of the supporting arm is rotatably connected to the base through the second connecting shaft. The massage device is arranged in the receiving space and a portion of the massage device protrudes from the receiving space toward the massage grooves.

20 Claims, 18 Drawing Sheets

(56) References Cited

U.S. PATENT DOCUMENTS

| | | | | |
|---|---|---|---|---|
| 2003/0070222 A1* | 4/2003 | Bastia | A61H 23/0263 4/622 |
| 2006/0207016 A1* | 9/2006 | Lev | A61H 33/6089 4/622 |
| 2018/0036195 A1* | 2/2018 | Zou | A61H 1/0266 |

* cited by examiner

PORTABLE MASSAGER

CROSS-REFERENCE TO RELATED APPLICATIONS

The present application is a U.S. patent application which claims the benefit of the filing date of Chinese Application No. 202110330378.8, filed 2021 Mar. 29, and Chinese Application No. 202120625541.9, filed 2021 Mar. 29, the disclosures of which are hereby incorporated by reference herein.

FIELD

The subject matter herein generally relates to a massager, and a more particularly, to a portable massager usable at multiple angles.

BACKGROUND

Massagers that relax muscles of a body, for example, feet and legs, are popular among people spending a lot of time in a same position, for example, working in front of a computer. However, when using the existing massager, a user must maintain a single posture, which reduces the comfort of using the massager.

Therefore, there is room for improvement within the art.

SUMMARY OF THE DISCLOSURE

What is needed, is a portable massager usable at multiple angles, which may enhance aesthetic value of parts of the human body, such as feet and legs A portable massager includes a housing, a first connecting shaft, a second connecting shaft, a supporting rod, a supporting arm, and a massage device. The housing includes an upper cover and a base. The upper cover and the base cooperatively define a receiving space. Two spaced apart massage grooves are recessed from the upper cover toward the base. Each of the massage grooves is in air communication with the receiving space. The first connecting shaft and the second connecting shaft are disposed on a bottom surface of the base facing away from the upper cover. An end of the supporting rod is rotatably connected to the base through the first connecting shaft. An end of the supporting arm is rotatably connected to the base through the second connecting shaft. The massage device is arranged in the receiving space and a portion of the massage device protrudes from the receiving space toward the massage grooves.

In the present disclosure, the portable massager may be a portable leg-beautifying massager. The portable massager may include the end of the supporting rod that is rotatably connected to the base and the end of the supporting arm that is rotatably connected to the base such that the portable massager may be used at multiple angles to adapt to different states and different parts of the user, thus improving comfort level for users of the portable massager.

BRIEF DESCRIPTION OF THE DRAWINGS

Implementations of the present technology will now be described, by way of example only, with reference to the attached figures.

DETAILED DESCRIPTION

Figure 1:
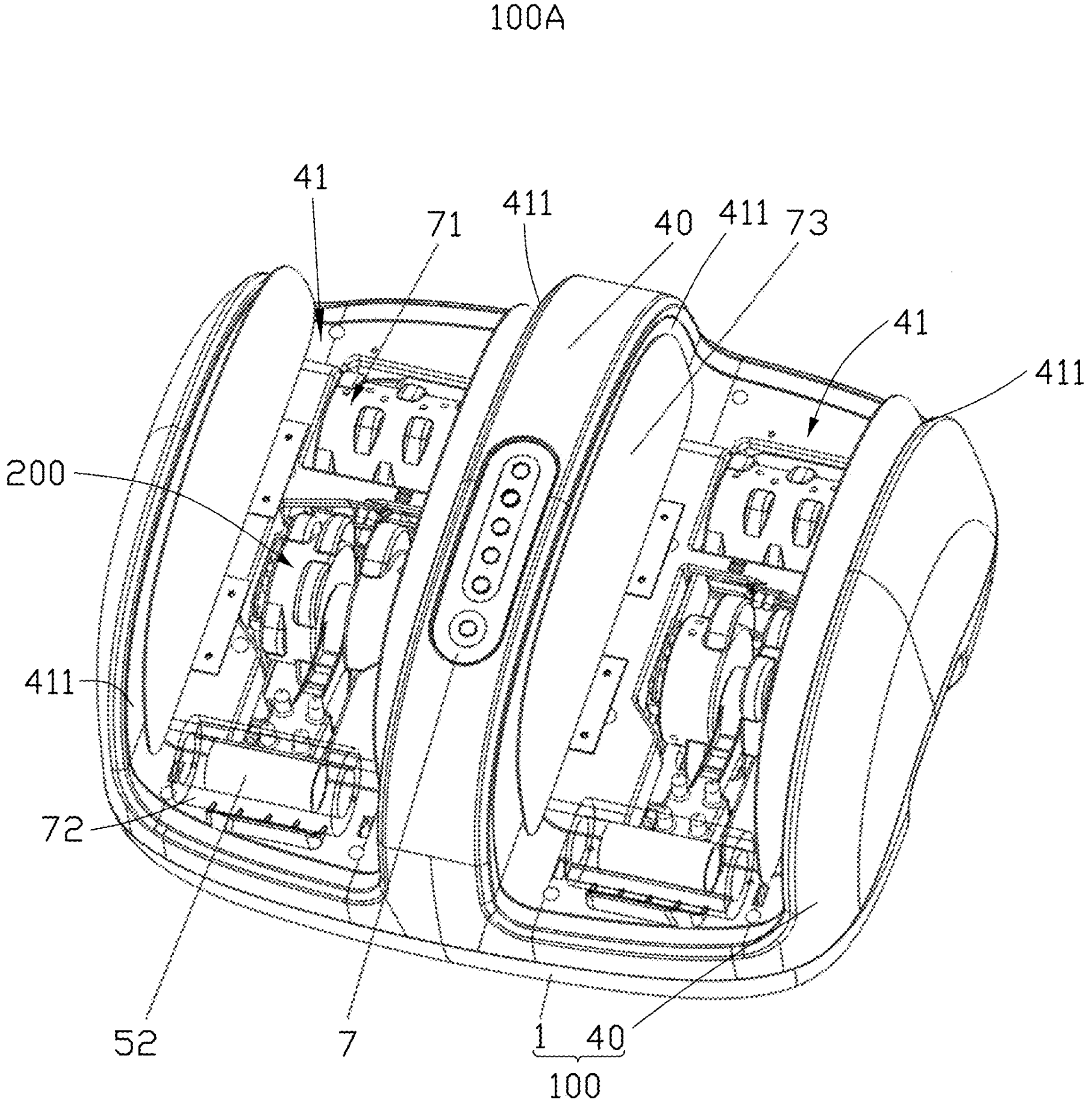
FIG. 1 is a perspective view of an embodiment of a portable massager according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

FIGS. 1-18 illustrate a portable massager 100A usable at multiple angles according to an example embodiment of the present disclosure. With reference to FIGS. 1 and 7-9, the portable massager 100A includes a housing 100, a first connecting shaft 10, a second connecting shaft 11, a supporting rod 12, a supporting arm 19, and a massage device 200. The housing 100 includes a base 1 and an upper cover 40. The base 1 and the upper cover 40 cooperate with each other to define a receiving space R (e.g., see FIG. 15). Two spaced apart massage grooves 41 are recessed from the upper cover 40 toward the base 1, and each of the massage grooves 41 is in air communication with the receiving space R. The massage device 200 is arranged in the receiving space R and a portion of the massage device 200 protrudes from the receiving space R toward the massage grooves 41.

With reference to FIGS. 1 and 7-9, the first connecting shaft 10 and the second connecting shaft 11 are disposed on a bottom surface 1*a* of the base 1 facing away from the upper cover 40.

With reference to FIGS. 1, 7-9, 17 and 18, an end 121 of the supporting rod 12 is rotatably connected to the base 1 through the first connecting shaft 10. A free end surface 122 of the supporting rod 12 facing away from the end 121 abuts the ground to prop a first side 101 of the base 1 off the ground and bring a second side 102 of the base 1 facing away from the first side 101 closer to the ground.

With reference to FIGS. 7, 8, 12, and 17, the portable massager 100A may further include a first non-slip mat 18 fixed on the free end surface 122 of the supporting rod 12. The first non-slip mat 18 may be in a shape of a sheet. In another embodiment, the shape of the first non-slip mat 18 may be varied as needed.

In at least one embodiment, with reference to FIGS. 1, 7-9, 12, and 16, a first receiving groove 103 may be recessed from the bottom surface 1*a* of the base 1 toward the upper cover 40 for receiving the supporting rod 12. The first connecting shaft 10 is fixed in the first receiving groove 103. In the illustrated embodiment, the supporting rod 12 may be rotatably sleeved on an outer surface of the first connecting shaft 10 to be received in the first receiving groove 103 or located outside the first receiving groove 103. Specifically, the supporting rod 12 includes a first connecting hole 120. The first connecting shaft 10 rotatably passes through the first connecting hole 120. In the illustrated embodiment, the portable massager 100A includes two supporting rods 12 and two first receiving grooves 103. Each first receiving groove 103 is used to receive one of the supporting rods 12.

In at least one embodiment, the supporting rod 12 may be a telescopic rod, such that an inclination angle of the base 1 with respect to the ground may be adjusted.

Figure 9:
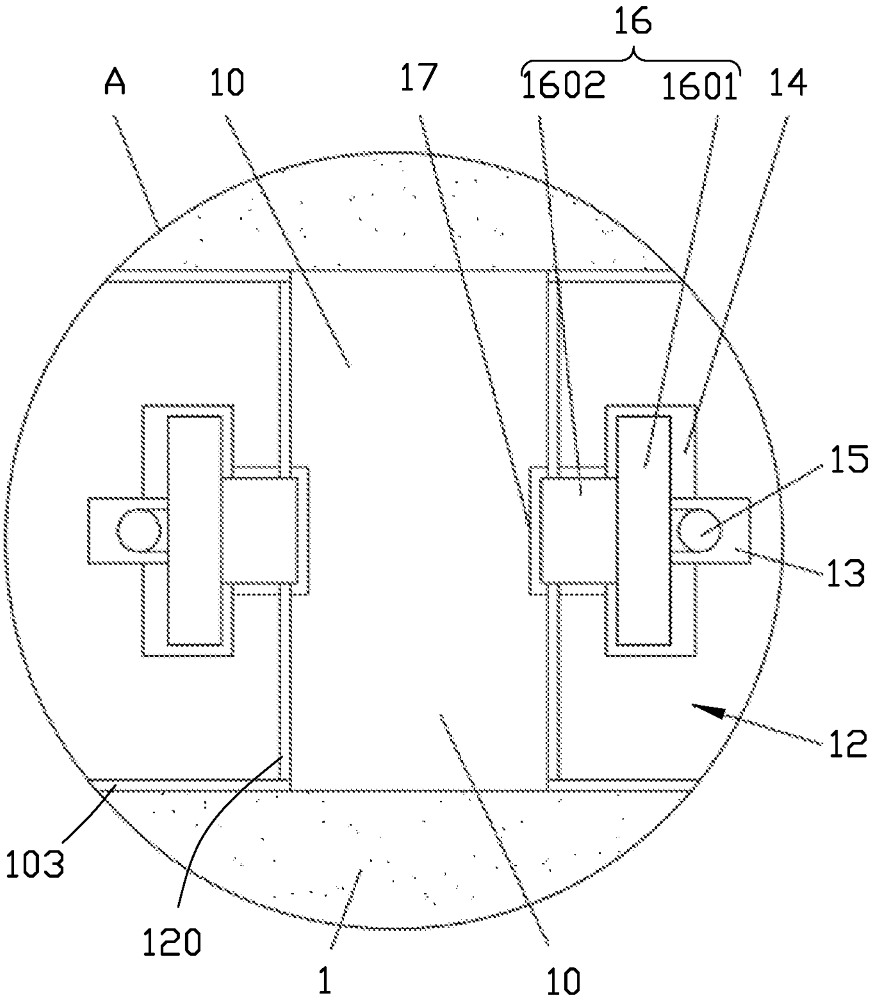
FIG. 9 is a partially enlarged view of an encircled area A in the portable massager of FIG. 8.
Figure 12:
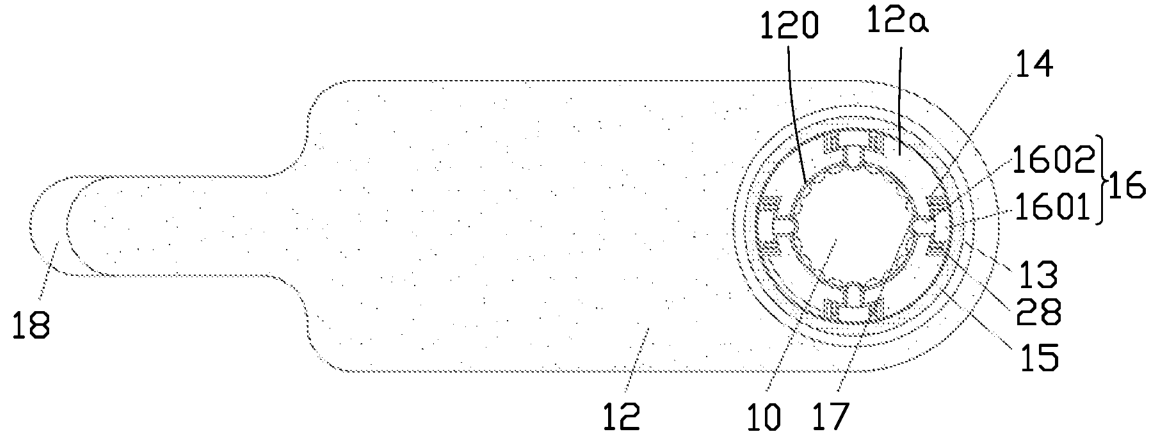
FIG. 12 is a partially enlarged cross-sectional view of a first connecting shaft of an embodiment of the portable massager according to the present disclosure.

In at least one embodiment, the supporting rod 12 may further include an annular cavity 13 (e.g., see FIG. 9). With reference to FIG. 12, the annular cavity 13 surrounds and is spaced apart from the first connecting hole 120, such that the supporting rod 12 includes an annular portion 12*a* between the annular cavity 13 and the first connecting hole 120. An elastic ring 15 is received in the annular cavity 13 to surround the first connecting shaft 10.

The supporting rod 12 further includes a plurality of connecting slots 14 formed on the annular portion 12*a* and surrounding the first connecting hole 120. Each connecting slot 14 is in air communication with the annular cavity 13 and the first connecting hole 120. In the illustrated embodiment, the number of the connecting slots 14 is four, and the connecting slots 14 are evenly distributed around the first connecting hole 120. A stopper 16 is movably received in one connecting slot 14 and an end of the stopper 16 facing away from the first connecting hole 120 contacts the elastic ring 15.

A plurality of stopping grooves 17 is formed on the outer surface of the first connecting shaft 10 and distributed around an axis of the first connecting shaft 10. An end of the stopper 16 facing the first connecting hole 120 is received in one of the plurality of stopping grooves 17 and may be switched to another groove 17 among the plurality of stopping grooves 17. When the stopper 16 is switched to another groove 17 among the plurality of stopping grooves 17, the elastic ring 15 is pressed against the stopper 16.

In at least one embodiment, the stopper 16 may include an arcuate block 1601 and a stopping head 1602 connected to the arcuate block 1601. An end of the arcuate block 1601 facing away from the stopping head 1602 is an arcuate surface, and the arcuate surface abuts the elastic ring 15. An end of the stopping head 1602 facing away from the arcuate block 1601 is movably received in any one of the plurality of stopping grooves 17.

In at least one embodiment, at least one guide pillar 28 is disposed in each connecting slot 14. The at least one guide pillar 28 is received in the arcuate block 1601, the arcuate block 1601 moves along the at least one guide pillar 28, such that a movement of the arcuate block 1601 in the connecting slot 14 may be smoother.

In the illustrated embodiment, an inner surface of each stopping groove 17 is an arcuate surface, and a shape of the end of the stopping head 1602 facing away from the arcuate block 1601 matches a shape of the inner surface of each stopping groove 17, thereby preventing the stopping head 1602 and the stopping groove 17 from being locked.

When the supporting rod 12 is rotated, the stopper 16 is driven by the supporting rod 12 to rotate around the first connecting shaft 10 such that the stopping groove 17 presses against the stopping head 1602 to separate the stopping head 1602 and the stopping groove 17, and at the same time the elastic ring 15 is squeezed to deform by the arcuate block 1601. When the supporting rod 12 is rotated to an appropriate (specific) angle and stops, the stopper 16 is temporarily held in one corresponding stopping groove 17 under an elastic force from the elastic ring 15 such that the supporting rod 12 is held in place, which may effectively support the massager 100A.

Figure 16:
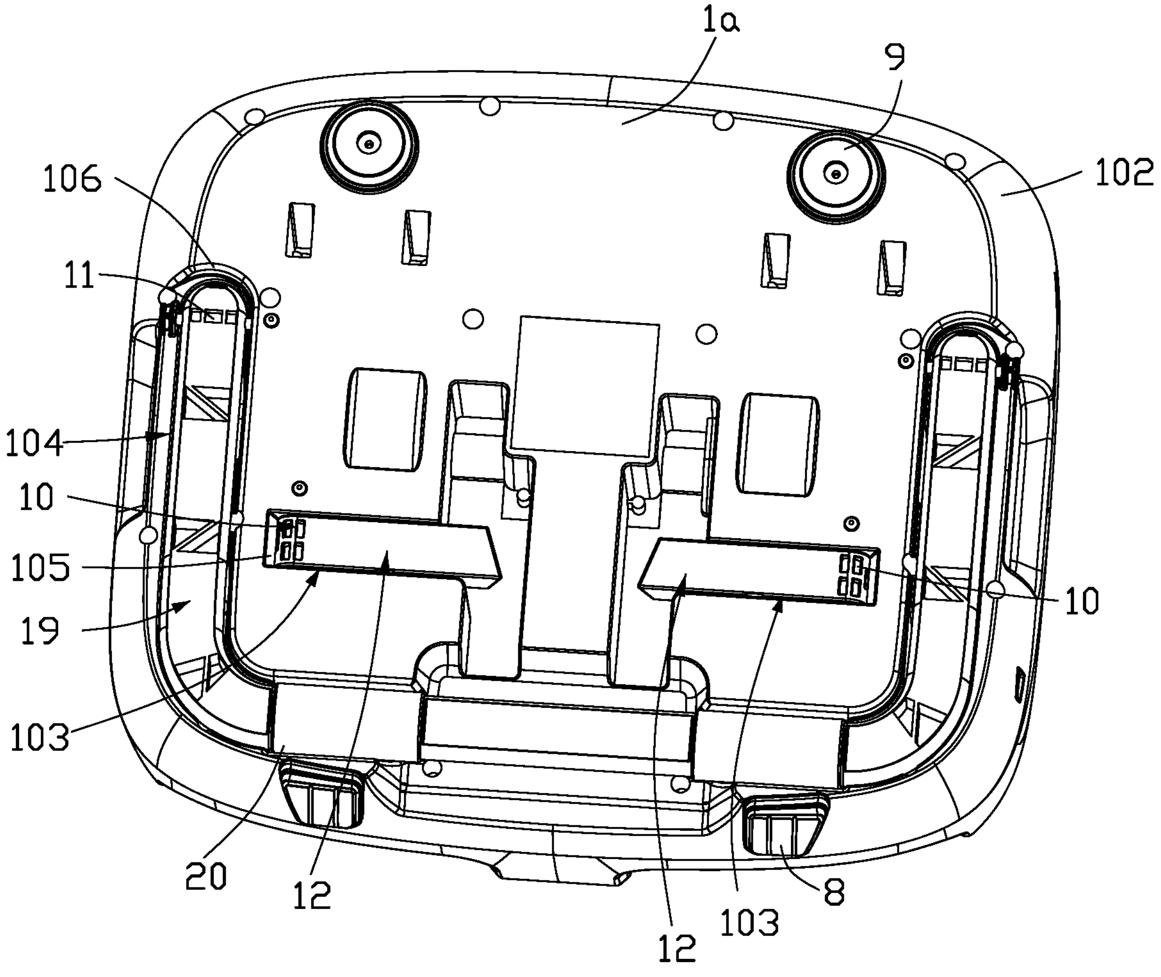
FIG. 16 is a bottom plan view of the portable massager of FIG. 14.

In at least one embodiment, with reference to FIG. 16, a stopper 105 adjacent the first connecting shaft 10 may be formed on the bottom surface 1*a* of the base 1 to stop the supporting rod 12 from continuing to rotate around the first connecting shaft 10, thereby restricting a rotation of the supporting rod 12.

Figure 18:
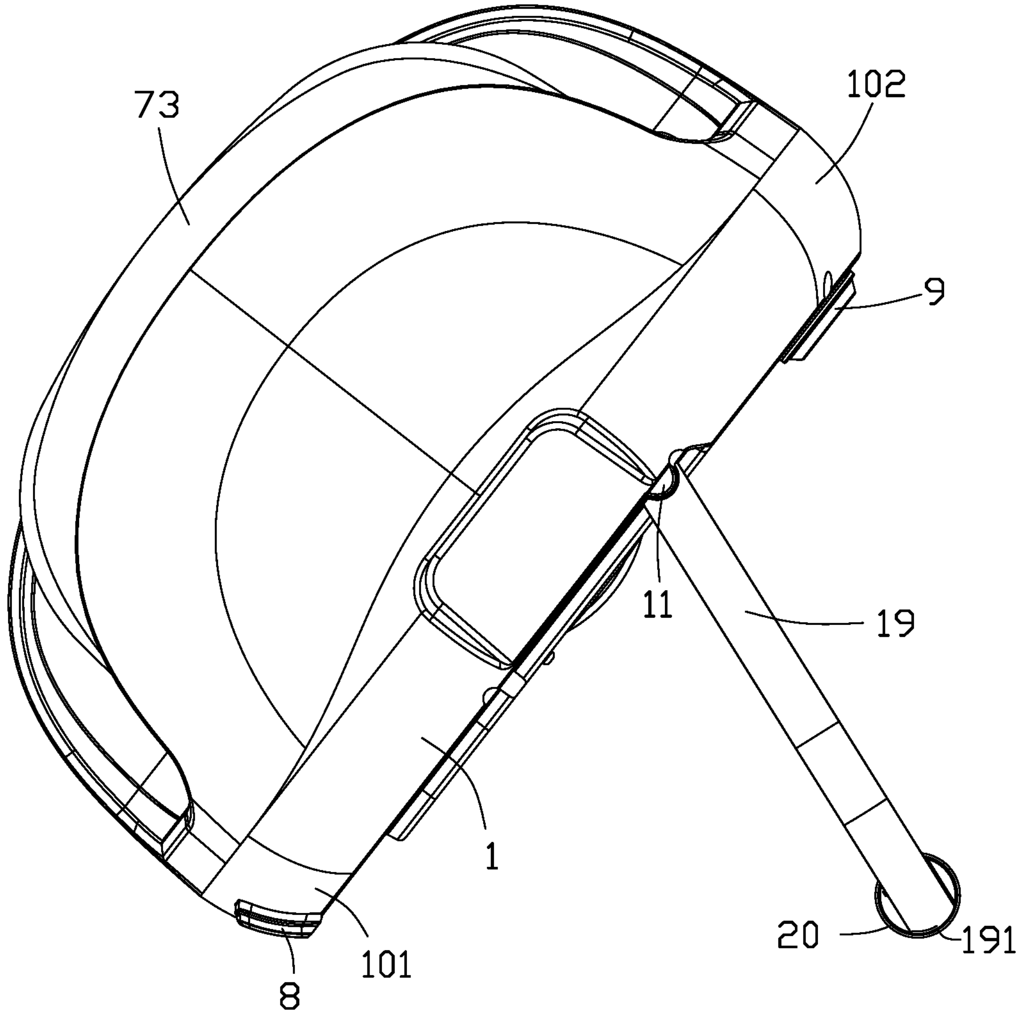
FIG. 18 is a diagram illustrating another example state of an embodiment of the portable massager according to the present disclosure.

With reference to FIG. 18, an end of the supporting arm 19 is rotatably connected to the base 1 through the second connecting shaft 11. A free end surface 191 of the supporting arm 19 facing away from the end of the supporting arm 19 is used to press against the ground to prop the second side 102 of the base 1 off the ground and bring the first side 101 of the base 1 closer to the ground.

The portable massager 100A may further include a second non-slip mat 20 fixed on the free end surface 191 of the supporting arm 19. In the illustrated embodiment, the second non-slip mat 20 is annular and sleeved on the supporting arm 19. In another embodiment, a shape of the second non-slip mat 20 may be varied as needed.

Figure 8:
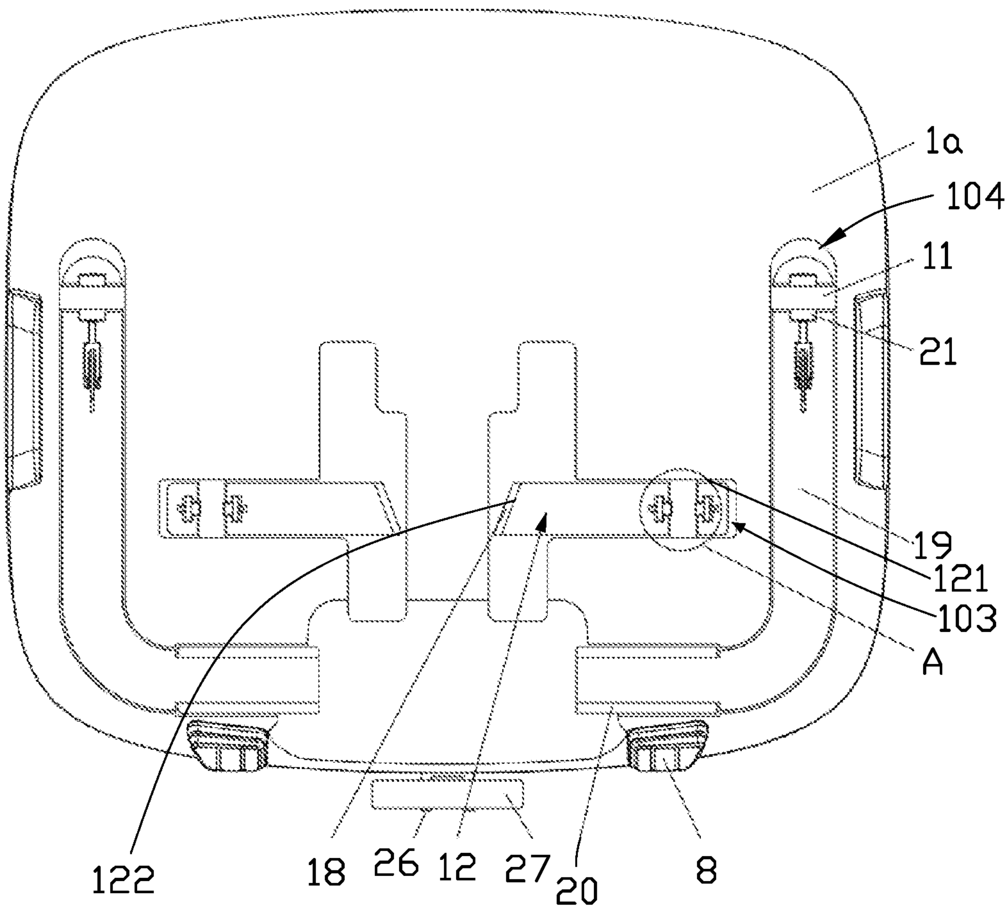
FIG. 8 is a cross-sectional view at a supporting arm of the portable massager according to the present disclosure.

In at least one embodiment, with reference to FIGS. 8 and 16, a second receiving groove 104 may be recessed from the bottom surface 1*a* of the base 1 toward the upper cover 40 for receiving the supporting arm 19. The second connecting shaft 11 is fixed in the second receiving groove 104. In the illustrated embodiment, the supporting arm 19 may be rotatably sleeved on an outer surface of the second connecting shaft 11 to be received in the second receiving groove 104 or located outside the second receiving groove 104. Specifically, with reference to FIG. 10, the supporting arm 19 includes a second connecting hole 190. The second connecting shaft 11 passes through the second connecting hole 190.

In at least one embodiment, the supporting arm 19 may be a telescopic arm, such that an inclination angle of the base 1 with respect to the ground may be adjusted.

In at least one embodiment, the supporting arm 19 may further include a first annular groove 22 recessed from an inner surface 190*a* of the supporting arm 19 forming the second connecting hole 190. A central axis of the first annular groove 22 is coincident with a central axis of the second connecting shaft 11. An annular ring 21 is sleeved on the second connecting shaft 11 and movably received in the first annular groove 22.

Figure 10:
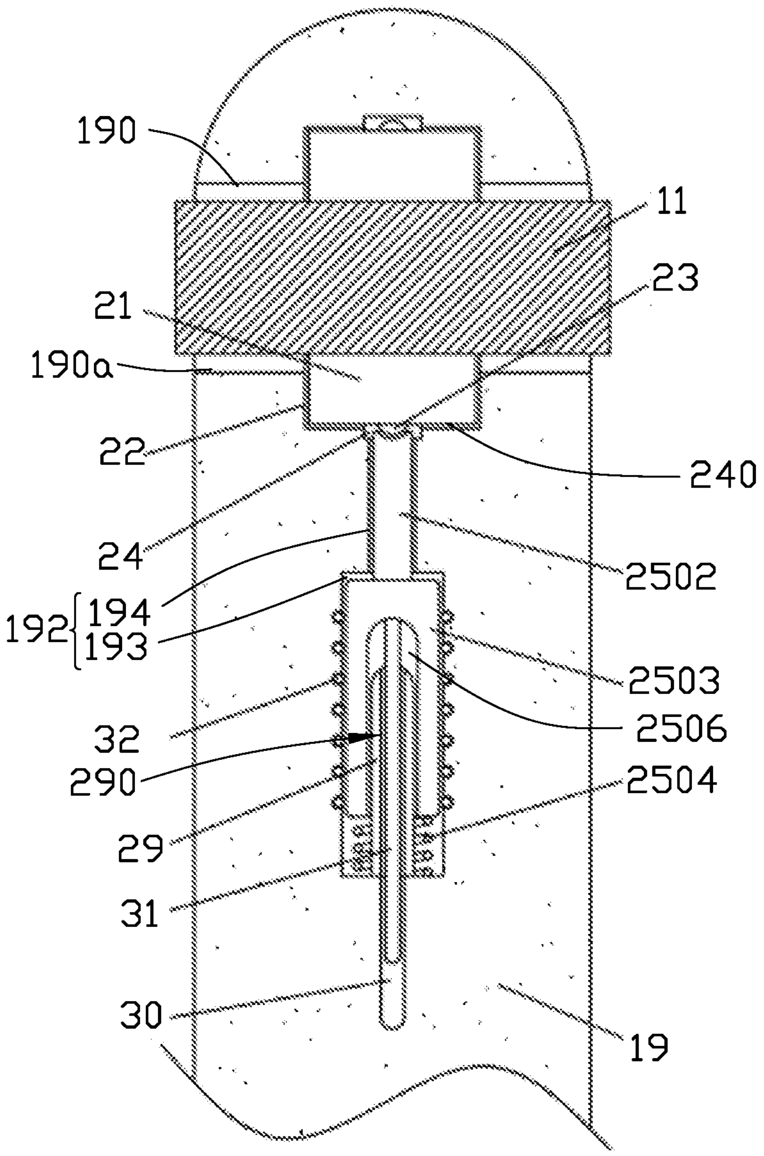
FIG. 10 is a partially enlarged view of—a second connecting shaft of the portable massager of FIG. 8.
Figure 11:
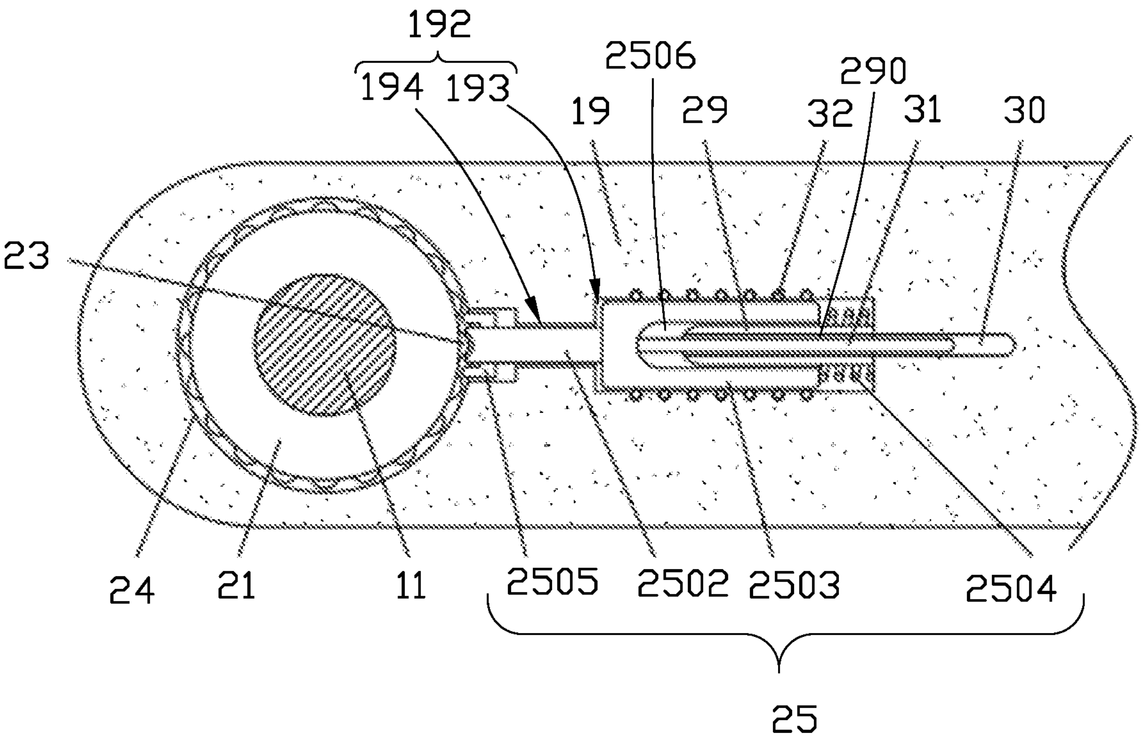
FIG. 11 is a partially enlarged cross-sectional view of the second connecting shaft of an embodiment of the portable massager according to the present disclosure.

With reference to FIGS. 10 and 11, a plurality of protrusions 23 protrudes from an outer surface of the annular ring 21 and is distributed around the central axis of the second connecting shaft 11. A second annular groove 24 is recessed from an inner surface 240 forming the first annular groove 22 toward a direction away from the central axis of the first annular groove 22. The plurality of protrusions 23 is movably received in the second annular groove 24. A central axis of the second annular groove 24 is coincident with the central axis of the second connecting shaft 11.

The supporting arm 19 further includes a guide cavity 192 having a first portion 193 and a second portion 194. The second portion 194 is in air communication with the first portion 193 and the second annular groove 24.

The portable massager 100A further includes a clamping assembly 25 received in the guide cavity 192. The clamping assembly 25 may include a clamping rod 2502, a connecting block 2503, and a spring 2504. The connecting block 2503 is movably received in the first portion 193. The clamping rod 2502 is connected to an end of the connecting block 2503 facing the second portion 194, and passes through the second portion 194. An end surface of the clamping rod 2502 facing away from the connecting block 2503 abuts one of the protrusions 23. The spring 2504 is received in the first portion 193 and an end of the connecting block 2503 facing away from the clamping rod 2502 abuts the spring toward the first portion 193. In the illustrated embodiment, an end of the spring 2504 is fixed on an inner surface of the first portion 193 facing away from the protrusions 23.

In the illustrated embodiment, the end surface of the clamping rod 2502 is an arcuate surface, a shape of a surface of each protrusion 23 contacting the clamping rod 2502 is configured to conform to a shape of the end surface of the clamping rod 2502.

The clamping assembly 25 may further include a clamping jaw 2505 adjacent to the protrusions 23 disposed on the clamping rod 2502 for clamping the protrusions 23 to improve stability of the connection between the clamping rod 2502 and the protrusions 23.

In at least one embodiment, a recess 2506 may be recessed from the end of the connecting block 2503 facing away from the clamping rod 2502 toward the clamping rod 2502. A guide sleeve 29 may be fixed on the inner surface of the first portion 193 facing away from the protrusions 23 and extend into the recess 2506. The spring 2504 is movably sleeved on the guide sleeve 29. When the connecting block 2503 moves in the first portion 193, the guide sleeve 29 guides the connecting block 2503 to move along the guide sleeve 29 such that the connecting block 2503 moves more smoothly.

In at least one embodiment, a guide groove 30 may be recessed from the inner surface of the first portion 193 facing away from the protrusions 23 toward a direction away from the second portion 194. The guide groove 30 corresponds to a through hole 290 of the guide sleeve 29. A guide rod 31 is fixed in the recess 2506, and extends through the through hole 290 into the guide groove 30. When the connecting block 2503 moves in the first portion 193, the guide rod 31 is driven by the connecting block 2503 to move along the guide groove 30, thereby preventing the connecting block 2503 from skewing when the connecting block 2503 moves.

In at least one embodiment, a plurality of balls 32 is movably embedded in another inner surface of the first portion 193 and buts the connecting block 2503. When the connecting block 2503 moves, the balls 32 rotate to reduce a friction between the connecting block 2503 and the first portion 193 such that the connecting block 2503 moves more smoothly.

When the supporting arm 19 is rotated, the clamping assembly 25 is driven by the supporting arm 19 to rotate around the second connecting shaft 11. The protrusions 23 press against the clamping rod 2502 to move along the second portion 194 such that the connecting block 2503 is driven by the clamping rod 2502 to move along the first portion 193 and compress the spring 2504. When the supporting arm 19 is rotated to an appropriate (specific) angle and stops, the connecting block 2503 is driven by an elastic force of the compressed spring 2504 to move toward the first connecting shaft 11, which drives the clamping rod 2502 to tightly abut one corresponding protrusion 23, and drives the clamping jaw 2505 to clamp the protrusion 23 at the same time such that an angle between the supporting arm 19 and the base 1 is fixed.

In at least one embodiment, a stopper 106 adjacent the second connecting shaft 11 may be formed on the bottom surface 1*a* of the base 1 to stop the supporting arm 19 from continuing to rotate around the second connecting shaft 11, thereby restricting a rotation of the supporting arm 19.

In the illustrated embodiment, the supporting arm 19 is substantially U-shaped, and the supporting arm 19 includes two ends rotatably connected to the base 1.

Figure 17:
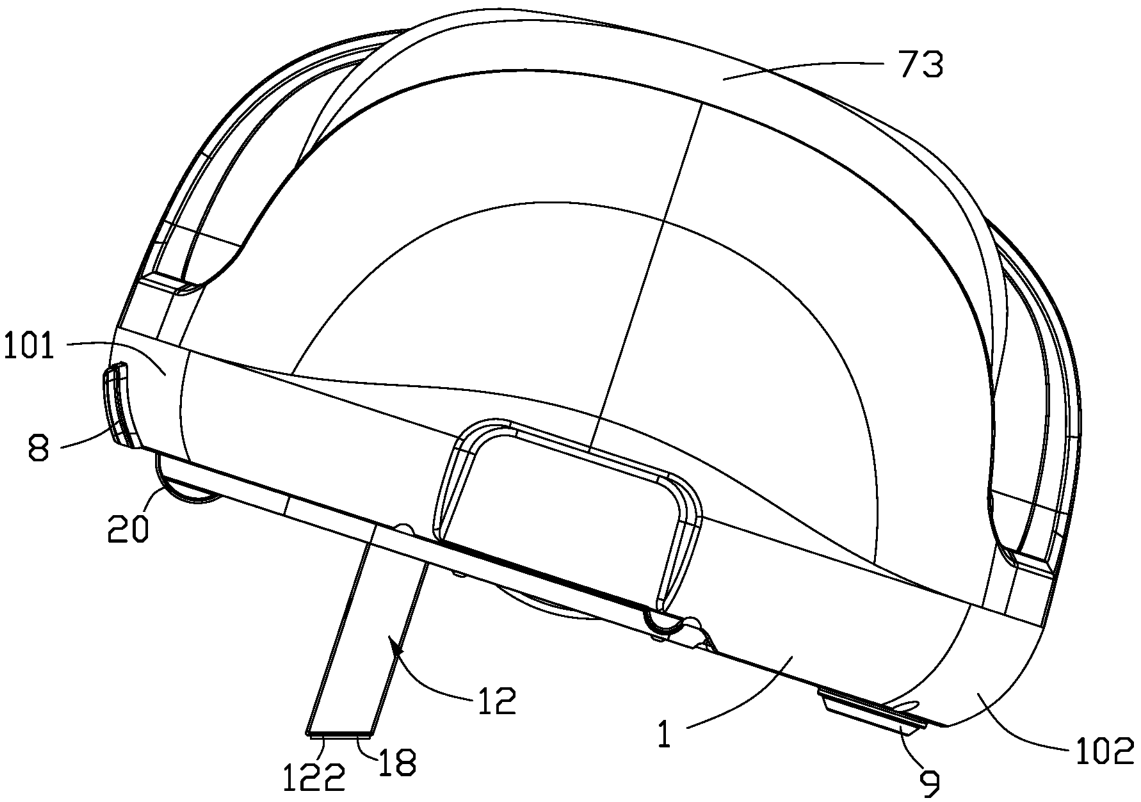
FIG. 17 is a diagram illustrating an example state of an embodiment of the portable massager according to the present disclosure.

In at least one embodiment, with reference to FIGS. 17 and 18, at least one first supporting mat 8 may be fixed to the first side 101 of the base 1. At least one second supporting mat 9 adjacent to the second side 102 of the base 1 may be fixed on the bottom surface 1*a* of the base 1. After the supporting rod 12 props the first side 101 of the base 1 off the ground, the at least one second supporting mat 9 contacts the ground to prevent the massager from sliding relative the ground. After the supporting arm 19 props the second side 102 of the base 1 off the ground, the at least one first supporting mat 8 contacts the ground to prevent the massager from sliding relative the ground.

Figure 3:
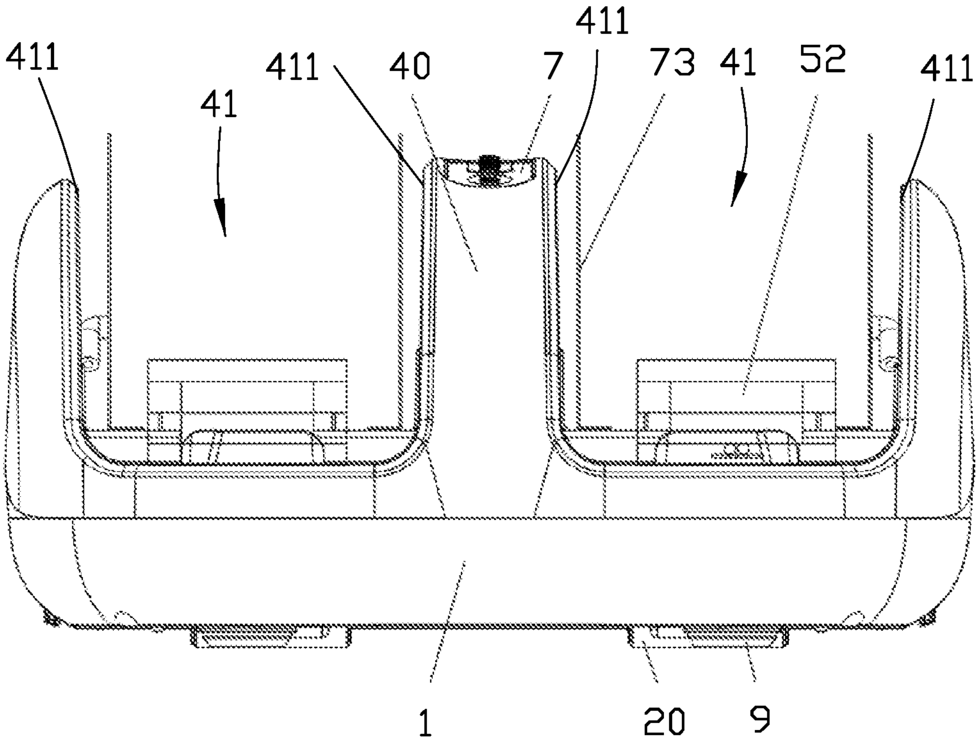
FIG. 3 is a front elevated view of the portable massager of FIG. 1.
Figure 4:
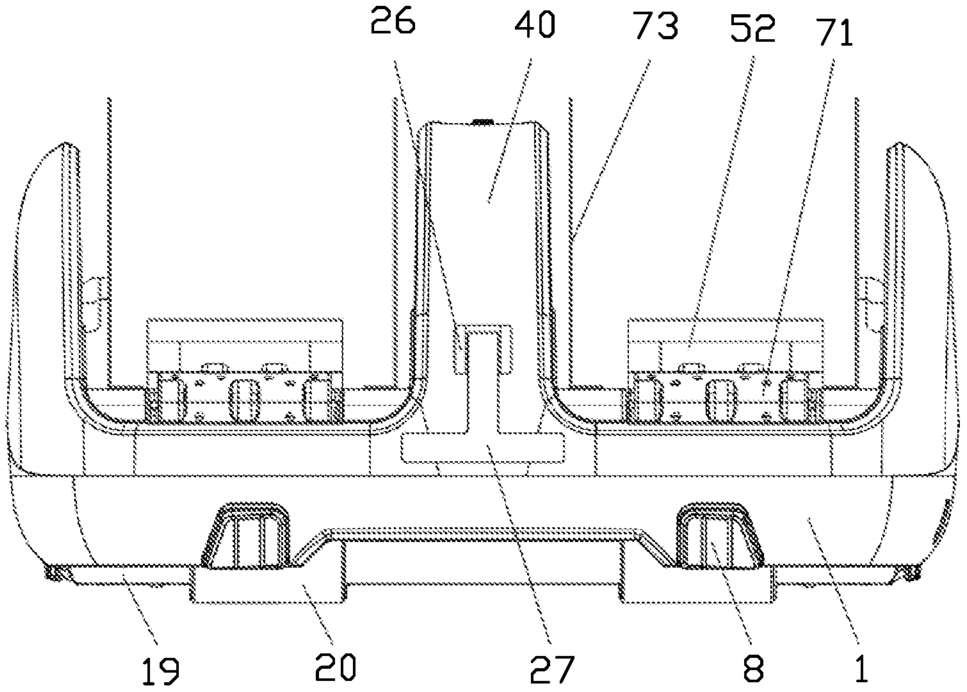
FIG. 4 is a rear elevated view of the portable massager of FIG. 1.

In at least one embodiment, with reference to FIGS. 1 and 3, two massage grooves 41 are arranged at intervals along a first direction. Two opposite side walls 411 form each of the massage grooves 41.

Figure 14:
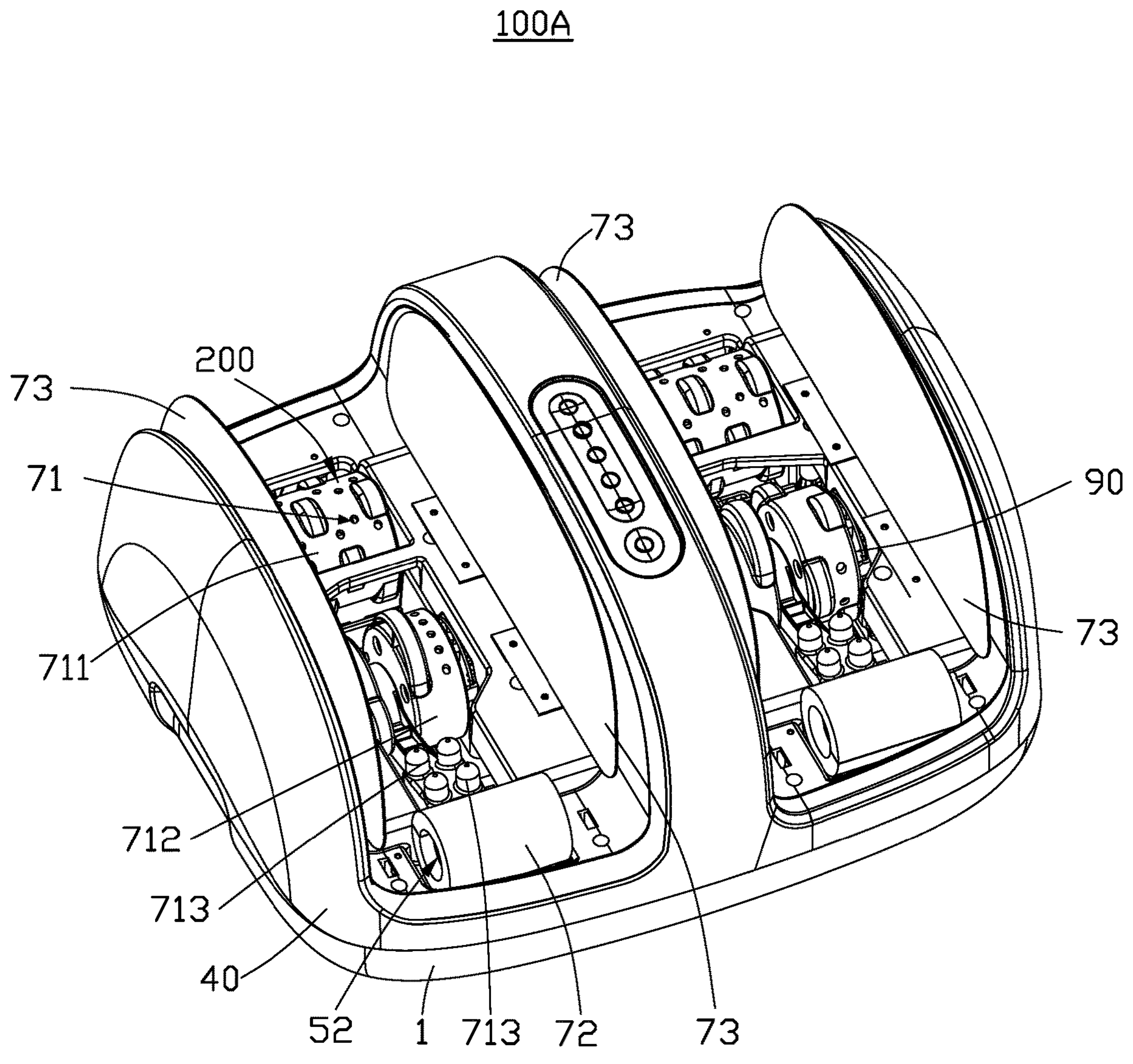
FIG. 14 is a perspective view of an embodiment of the portable massager according to the present disclosure.
Figure 15:
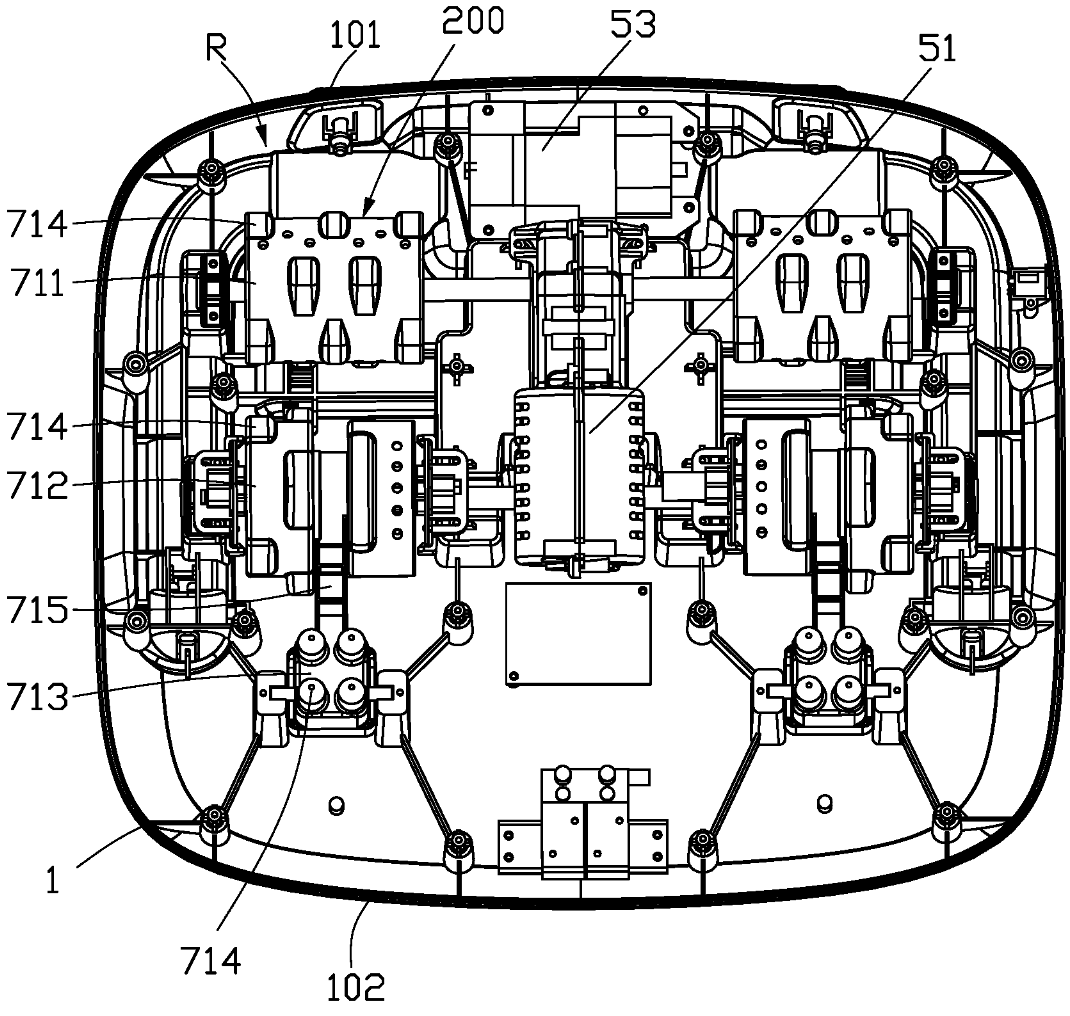
FIG. 15 is a partially exposed view of an embodiment of the portable massager according to the present disclosure.

With reference to FIGS. 1, 14, and 15, the massage device 200 may include a rolling generator 51, a vibration generator 52, an air pump 53, a rolling massage assembly 71, a vibration massage assembly 72, and airbags 73. The rolling generator 51, the vibration generator 52, the air pump 53 are received in the receiving space R. The rolling massage assembly 71 and the vibration massage assembly 72 protrude from the receiving space R toward the massage grooves 41. The airbags 73 are installed on the side walls 411. In the illustrated embodiment, one airbag 73 is installed on each of the side walls 411.

The rolling generator 51 is drivingly connected to the rolling massage assembly 71 to drive the rolling massage assembly 71. The vibration generator 52 is drivingly connected to the vibration massage assembly 72 to drive the vibration massage assembly 72 to vibrate. Each of the airbags 73 is in air communication with the air pump 53. Each of the airbags 73 can be filled with air to expand or deflated to shrink by the air pump 53.

In at least one embodiment, the rolling massage assembly 71 may include a first roller 711, a second roller 712, and a swing arm 713. The second roller 712 is located between the first roller 711 and the swing arm 713. In the illustrated embodiment, the first roller 711 is located a side of the second roller 712 close to the first side 101 of the base 1, and the swing arm 713 is located a side of the second roller 712 close to the second side 102 of the base 1.

The first roller 711 and the second roller 712 are drivingly connected to the rolling generator 51, respectively. The rolling generator 51 may be a motor. The first roller 711 and the second roller 712 roll when driven by the rolling generator 51. The swing arm 713 is connected to the second roller 712 through an eccentric rocker 715. When the second roller 712 rolls, the eccentric rocker 715 drives the swing arm 713 to swing.

Each of the first roller 711, the second roller 712 and the swing arm 713 includes at least one protruding portion 714 for massage.

In at least one embodiment, the vibration massage assembly 72 is substantially cylindrical. The vibration massage assembly 72 may be made of rubber or sponge. The vibration massage assembly 72 is sleeved on the vibration generator 52.

The massage device 200 may further include at least one heating element 90 adjacent to the rolling generator 51.

Figure 2:
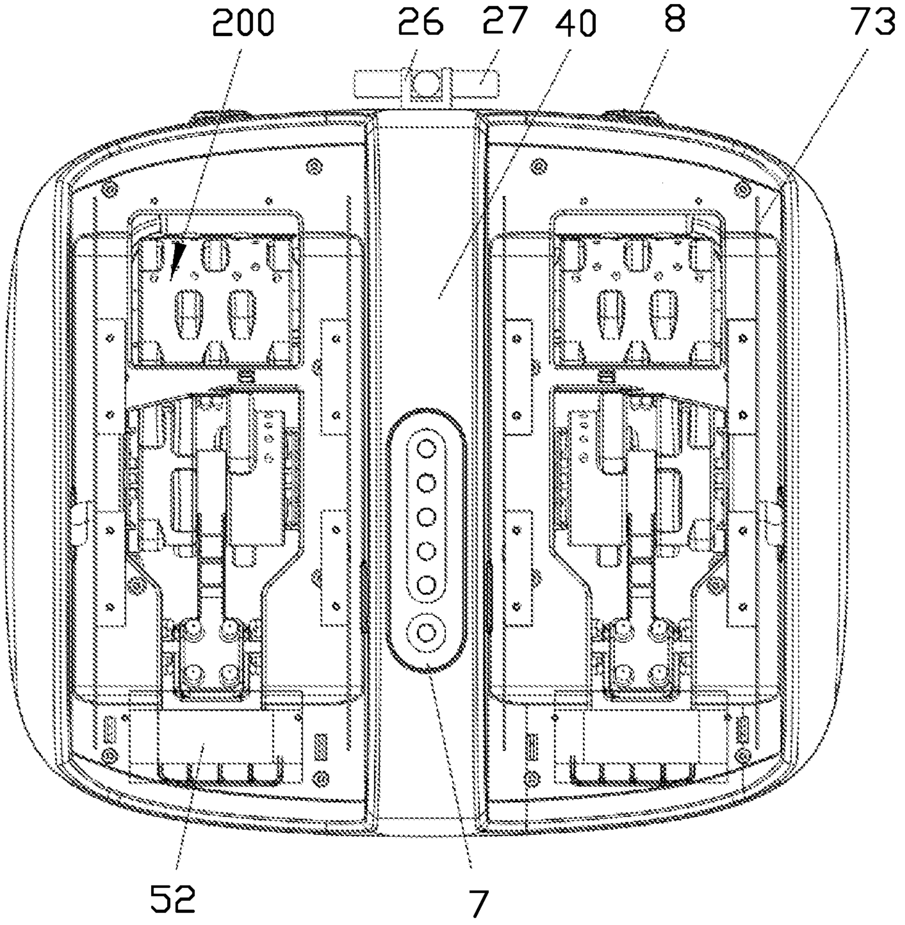
FIG. 2 is a top plan view of the portable massager of FIG. 1.

With reference to FIGS. 2 and 3, the portable massager 100A may further include a control assembly 7 electrically connected to the massage device 200. The control assembly 7 may be installed on the upper cover 40. The control assembly 7 includes at least one button (not labelled) to control the start and the stop of the rolling generator 51, the vibration generator 52, the air pump 53, and the at least one heating element 90.

Figure 5:
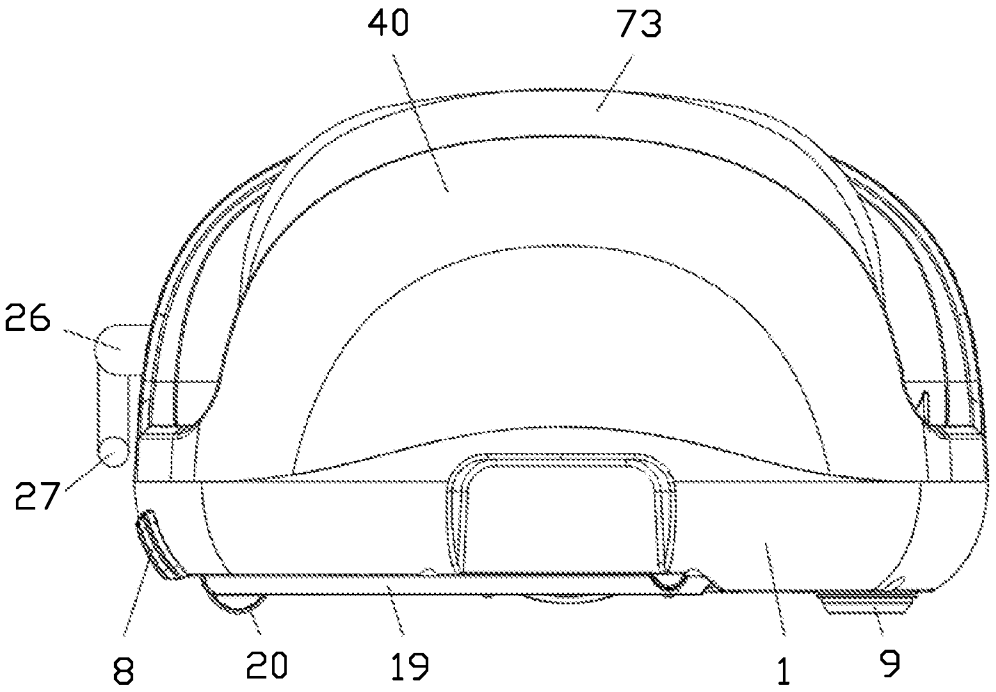
FIG. 5 is a left-side elevated view of the portable massager of FIG. 1.
Figure 6:
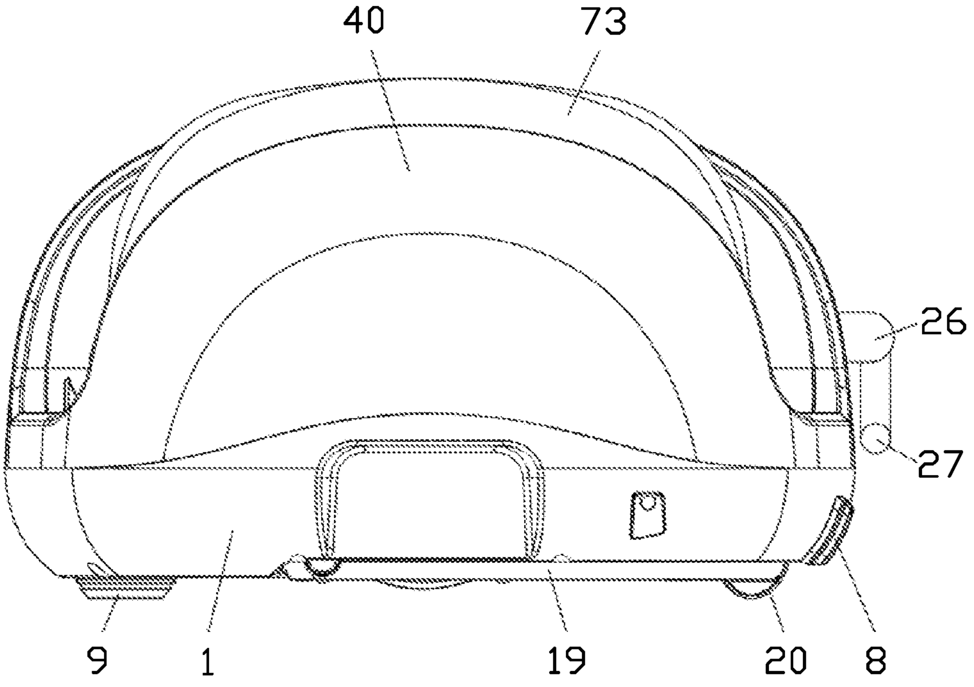
FIG. 6 is a right-side elevated view of the portable massager of FIG. 1.
Figure 7:
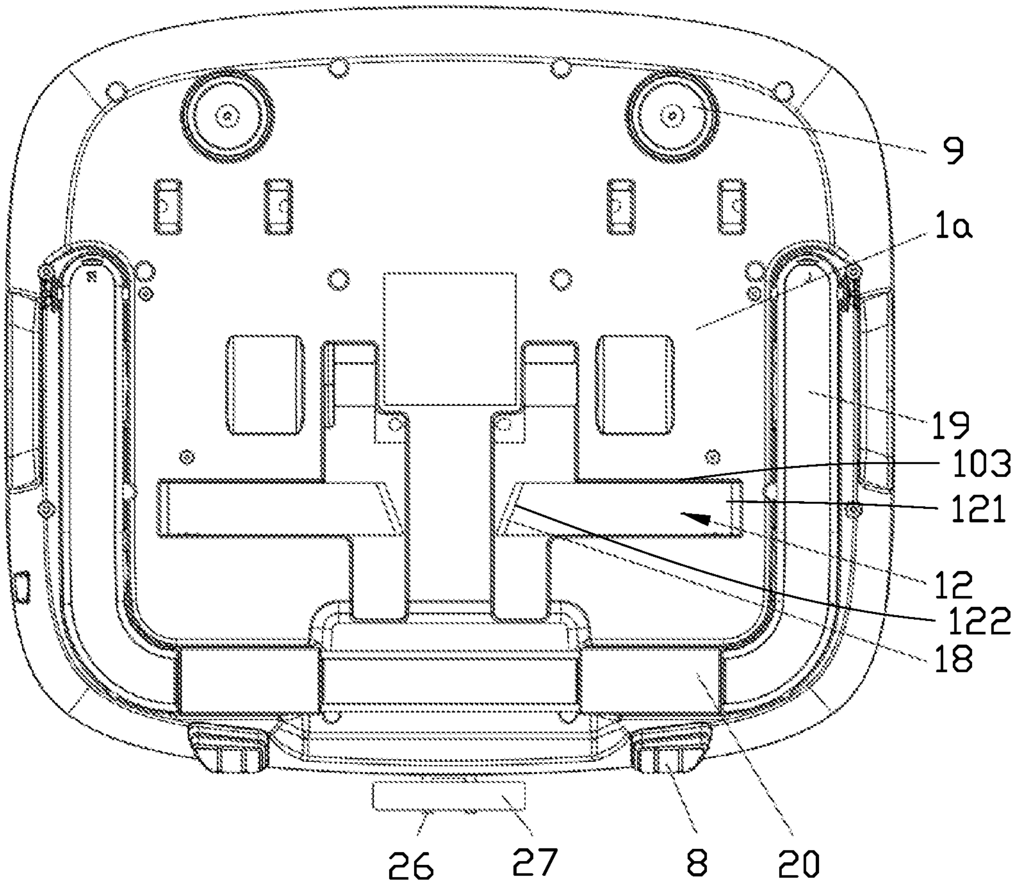
FIG. 7 is a bottom plan view of the portable massager of FIG. 1.
Figure 13:
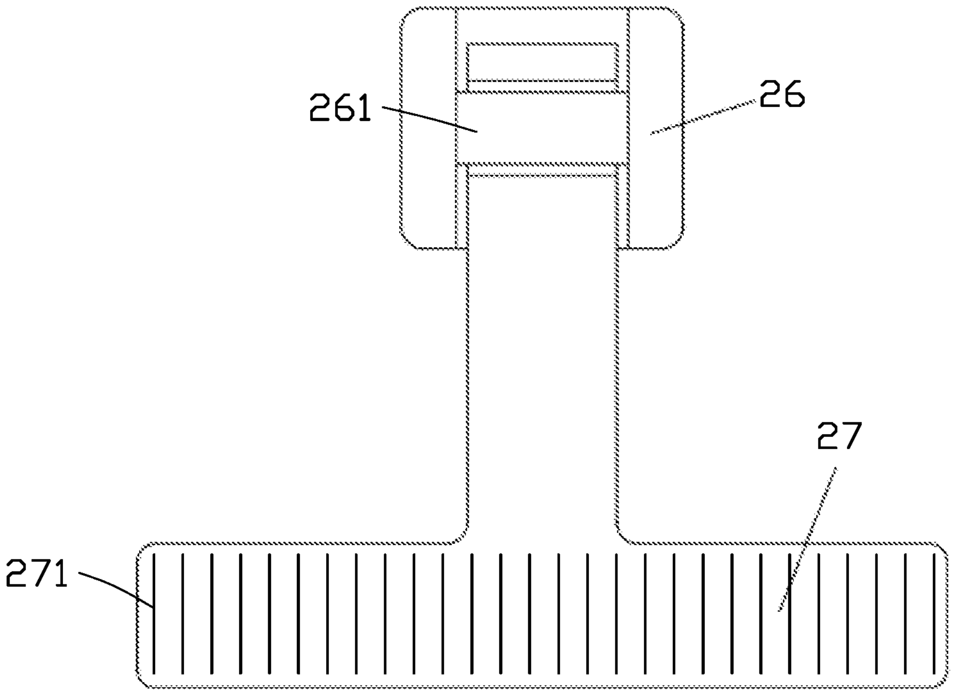
FIG. 13 is a cross-sectional view of a connecting portion and a T-shaped handle of the portable massager according to the present disclosure.

With reference to FIGS. 2, 5, and 13, a connecting portion 26 may be mounted on the housing 100. In the illustrated embodiment, the connecting portion 26 is mounted on the upper cover 40.

With reference to FIG. 13, a T-shaped handle 27 with anti-skid patterns 271 is rotatably coupled to a rotating shaft 261 of the connecting portion 26. The portable massager 100A may be lifted by holding the T-shaped handle 27.

When the supporting rod 12 and the supporting arm 19 are in a retracted state, the bottom surface 1*a* of the base 1, the second supporting mat 9, or the second non-slip mat 20 may contact the ground, such that the portable massager 100A is flat on the ground (e.g., see FIG. 5), and the user can sit to massage soles of the feet, or the user and the portable massager 100A are at similar height to massage calves of the user.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A portable massager comprising:

a housing comprising an upper cover and a base connecting to the upper cover, wherein the base defines a receiving space, two spaced apart massage grooves are recessed from the upper cover toward the base, each of the massage grooves is in air communication with the receiving space;

a first connecting shaft and a second connecting shaft disposed on a bottom surface of the base facing away from the upper cover;

a supporting rod, wherein an end of the supporting rod is rotatably connected to the base through the first connecting shaft;

a supporting arm, wherein an end of the supporting arm is rotatably connected to the base through the second connecting shaft;

a massage device, arranged in the receiving space and a portion of the massage device protruding from the receiving space toward the massage grooves;

wherein the supporting rod comprises a first connecting hole and an annular cavity, the first connecting shaft rotatably passes through the first connecting hole, and the annular cavity surrounds and is spaced apart from the first connecting hole;

the supporting rod further comprises an annular portion between the annular cavity and the first connecting hole;

a plurality of connecting slots is formed on the annular portion and surrounds the first connecting hole, each of the plurality of connecting slots is in air communication with the annular cavity and the first connecting hole;

an elastic ring is received in the annular cavity to surround the first connecting shaft, a stopper is movably received in each of the plurality of connecting slots and an end of the stopper facing away from the first connecting hole contacts the elastic ring; and a plurality of stopping grooves is formed on an outer surface of the first connecting shaft and distributed around an axis of the first connecting shaft, and an end of the stopper facing the first connecting hole is detachably received in one of the plurality of stopping grooves.

2. The portable massager of claim 1, further comprising:

a first receiving groove recessed from the bottom surface of the base toward the upper cover for receiving the supporting rod, the first connecting shaft installed in the first receiving groove; and a second receiving groove recessed from the bottom surface of the base toward the upper cover for receiving the supporting arm, the second connecting shaft installed in the second receiving groove.

3. The portable massager of claim 1, further comprising a first non-slip mat and a second non-slip mat, wherein:

the first non-slip mat is fixed on a free end surface of the supporting rod facing away from the end of the supporting rod; and the second non-slip mat is fixed on a free end surface of the supporting arm facing away from the end of the supporting arm.

4. The portable massager of claim 1, wherein:

the stopper comprises an arcuate block and a stopping head connected to the arcuate block;

an end of the arcuate block facing away from the stopping head abuts the elastic ring; and an end of the stopping head facing away from the arcuate block is movably received in one of the plurality of stopping grooves.

5. The portable massager of claim 4, wherein:

at least one guide pillar is disposed in each of the plurality of connecting slots; and the at least one guide pillar is received in the arcuate block, and the arcuate block moves along the at least one guide pillar.

6. The portable massager of claim 4, wherein:

an inner surface of each of the plurality of stopping grooves is an arcuate surface, and a shape of the end of the stopping head facing away from the arcuate block conforms with a shape of the inner surface of each of the plurality of stopping grooves; and the end of the arcuate block facing away from the stopping head is an arcuate surface.

7. The portable massager of claim 1, wherein:

the supporting arm comprises a second connecting hole and a first annular groove, the second connecting shaft passes through the second connecting hole, the first annular groove is recessed from an inner surface of the supporting arm forming the second connecting hole;

an annular ring is sleeved on the second connecting shaft and movably received in the first annular groove;

a plurality of protrusions protrudes from an outer surface of the annular ring and is distributed around a central axis of the second connecting shaft, a second annular groove is recessed from an inner surface forming the first annular groove toward a direction away from the central axis of the second connecting shaft, the plurality of protrusions is movably received in the second annular groove; and a clamping assembly for detachably abutting the plurality of protrusions is movably received in the supporting arm.

8. The portable massager of claim 7, wherein:

the supporting arm further comprises a guide cavity including a first portion and a second portion, the second portion is in air communication with the first portion and the second annular groove;

the clamping assembly is received in the guide cavity and comprises a clamping rod, a connecting block, and a spring;

the connecting block is movably received in the first portion, the clamping rod is connected to an end of the connecting block facing the second portion, and passes through the second portion;

an end surface of the clamping rod facing away from the connecting block abuts the plurality of protrusions; and the spring is received in the first portion and an end of the connecting block facing away from the clamping rod abuts the spring toward the first portion.

9. The portable massager of claim 8, wherein the clamping assembly further comprises a clamping jaw abutting the protrusions and disposed on the clamping rod.

10. The portable massager of claim 8, wherein:

a recess is recessed from the end of the connecting block that is facing away from the clamping rod toward the clamping rod;

a guide sleeve is fixed on an inner surface of the first portion facing away from the protrusions and extends into the recess; and the spring is movably sleeved on the guide sleeve.

11. The portable massager of claim 10, wherein:

a guide groove is recessed from the inner surface of the first portion facing away from the protrusions toward a direction away from the second portion, and the guide groove corresponds to a through-hole of the guide sleeve; and a guide rod is fixed in the recess and movably extends through the through-hole into the guide groove.

12. The portable massager of claim 8, wherein a plurality of balls is movably embedded in an inner surface of the first portion and abuts the connecting block.

13. The portable massager of claim 8, wherein the end surface of the clamping rod facing away from the connecting block is an arcuate surface, and a shape of a surface of each protrusion abutting the clamping rod conforms to a shape of the end surface of the clamping rod.

14. The portable massager of claim 1, further comprising:

a connecting portion mounted on the housing, wherein the connecting portion comprises a rotating shaft; and a T-shaped handle with anti-skid patterns rotatably coupled to the rotating shaft.

15. The portable massager of claim 1, wherein:

the massage device comprises a rolling generator and a rolling massage assembly;

the rolling generator is received in the receiving space; and the rolling massage assembly protrudes from the receiving space toward the massage grooves and is drivingly connected to the rolling generator.

16. The portable massager of claim 15, wherein the massage device further comprises at least one heating element adjacent to the rolling generator.

17. The portable massager of claim 1, wherein:

the massage device comprises a vibration generator and a vibration massage assembly;

the vibration generator is received in the receiving space; and the vibration massage assembly protrudes from the receiving space toward the massage grooves and is drivingly connected to the vibration generator.

18. The portable massager of claim 1, wherein two opposite side walls form each of the massage grooves; and the massage device comprises an air pump and a plurality of airbags, each of the plurality of airbags is in air communication with the air pump; and each of the side walls is coupled to one of the plurality of airbags.

19. A portable massager comprising:

a housing comprising an upper cover and a base connecting to the upper cover, wherein the base defines a receiving space, two spaced apart massage grooves are recessed from the upper cover toward the base, each of the massage grooves is in air communication with the receiving space;

a first connecting shaft and a second connecting shaft disposed on a bottom surface of the base facing away from the upper cover;

a supporting rod, wherein an end of the supporting rod is rotatably connected to the base through the first connecting shaft;

a supporting arm, wherein an end of the supporting arm is rotatably connected to the base through the second connecting shaft;

a massage device, arranged in the receiving space and a portion of the massage device protruding from the receiving space toward the massage grooves;

the supporting arm comprises a second connecting hole and a first annular groove, the second connecting shaft passes through the second connecting hole, the first annular groove is recessed from an inner surface of the supporting arm forming the second connecting hole;

an annular ring is sleeved on the second connecting shaft and movably received in the first annular groove;

a plurality of protrusions protrudes from an outer surface of the annular ring and is distributed around a central axis of the second connecting shaft, a second annular groove is recessed from an inner surface forming the first annular groove toward a direction away from the central axis of the second connecting shaft, the plurality of protrusions is movably received in the second annular groove; and a clamping assembly for detachably abutting the plurality of protrusions is movably received in the supporting arm.

20. A portable massager comprising:

a housing comprising an upper cover and a base connecting to the upper cover, the base defining a receiving space, the upper cover defining two massage grooves spaced apart from each other, each of the two massage grooves being in air communication with the receiving space, the base comprising a first side and a second side opposite to the first side;

a supporting rod, the supporting rod comprising a first end rotatably connected to the base and a second end that is free and configured to abut against the ground, the supporting rod being configured to support the base with the first side above the ground and the second side close to the ground;

a supporting arm, the supporting arm comprising an end rotatably connected to the base and a free end configured to abut against the ground, the supporting arm being configured to support the base with the second side above the ground and the first side close to the ground; and a massage device, in the receiving space and a portion of the massage device protruding from the receiving space toward the massage grooves.

* * * * *